(12) United States Patent
Bejugam

(10) Patent No.: US 10,930,146 B1
(45) Date of Patent: Feb. 23, 2021

(54) TRAFFIC CONTROL SYSTEM AND METHOD FOR OPERATING SAME

(71) Applicant: Continental Automotive Systems, Inc., Auburn Hills, MI (US)

(72) Inventor: Ramtej Bejugam, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/738,019

(22) Filed: Jan. 9, 2020

Related U.S. Application Data

(60) Provisional application No. 62/952,549, filed on Dec. 23, 2019.

(51) Int. Cl.
*G08G 1/095* (2006.01)
*G08G 1/08* (2006.01)
*G08G 1/01* (2006.01)

(52) U.S. Cl.
CPC ............. *G08G 1/08* (2013.01); *G08G 1/0145* (2013.01)

(58) Field of Classification Search
CPC .................................. G08G 1/08; G08G 1/095
USPC ............... 340/907, 905, 911, 917, 936, 332; 701/117, 119
See application file for complete search history.

(56) References Cited

U.S. PATENT DOCUMENTS

| | | | |
|---|---|---|---|
| 6,633,238 | B2 | 10/2003 | Lemelson et al. |
| 9,142,127 | B1 | 9/2015 | McDevitt-Pimbley et al. |
| 9,235,989 | B2 | 1/2016 | Collum et al. |
| 10,121,369 | B2 | 11/2018 | Hofman |
| 2015/0302741 | A1* | 10/2015 | Vala ................. G08G 1/096741 340/916 |
| 2019/0035262 | A1 | 1/2019 | Brady et al. |
| 2019/0051167 | A1 | 2/2019 | Malkes et al. |

FOREIGN PATENT DOCUMENTS

| | | |
|---|---|---|
| EP | 2913809 | 9/2015 |
| KR | 101728080 | 4/2017 |

\* cited by examiner

*Primary Examiner* — Tai T Nguyen

(57) ABSTRACT

A method of operating an intersection traffic signal includes operating the intersection traffic signal based on a standard signal pattern, determining an adverse road condition on a road surface adjacent an intersection, and determining when a first vehicle on the road surface is within a predetermined distance of the intersection. A signal time period is adjusted for the intersection traffic signal when the adverse road condition is present and the first vehicle is within a predetermined distance of the intersection.

17 Claims, 2 Drawing Sheets

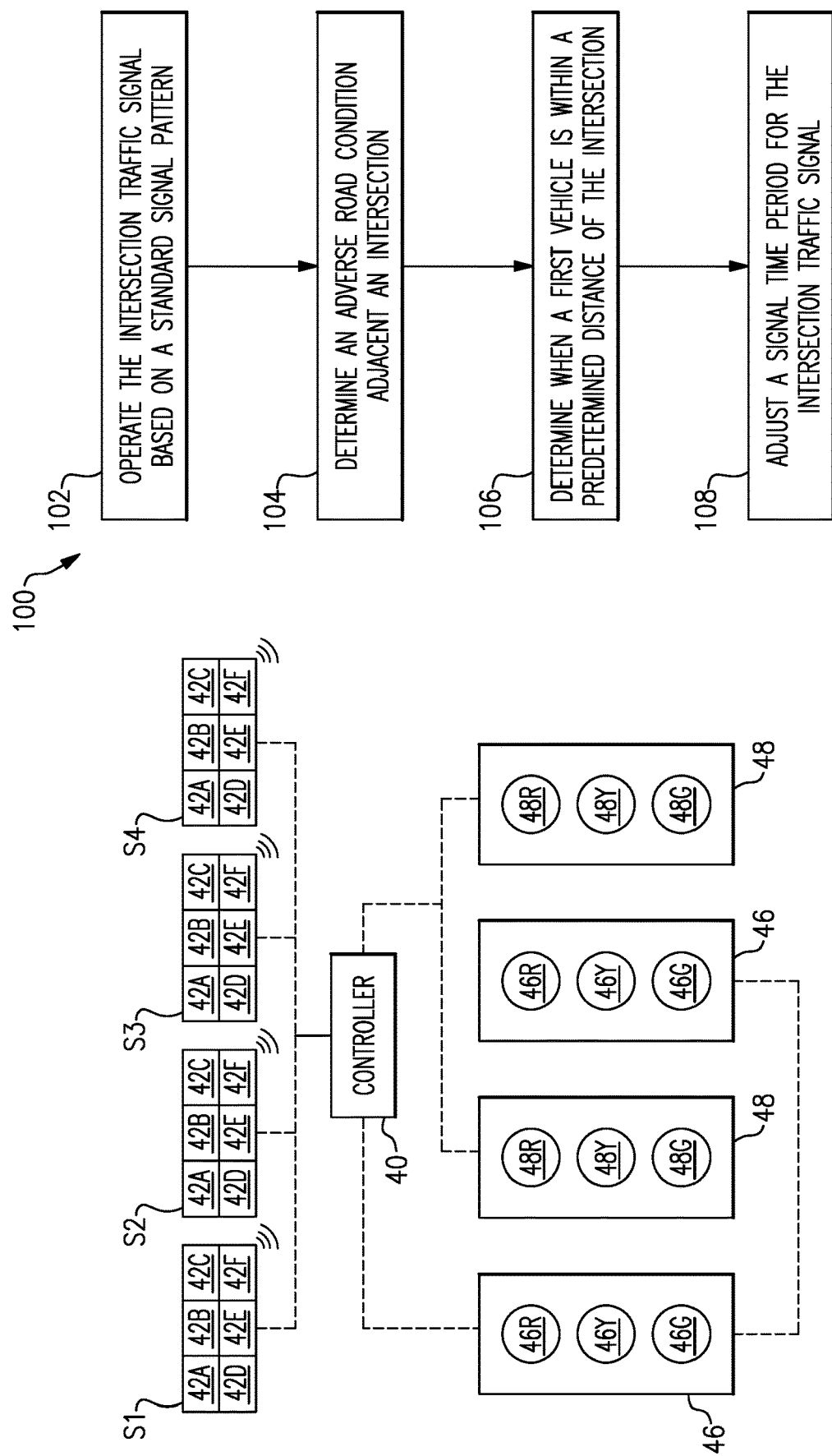

TRAFFIC CONTROL SYSTEM AND METHOD FOR OPERATING SAME

CROSS-REFERENCE TO RELATED APPLICATIONS

This application claims priority to U.S. Provisional Application No. 62/952,549, which was filed on Dec. 23, 2019 and is incorporated herein by reference.

BACKGROUND

The present disclosure generally relates to a traffic signal control system, and more particularly to a system and method for adaptively controlling traffic signals.

Traffic signal control systems manage the phasing and timing of traffic signals to direct the flow of traffic through an intersection. The traffic signal control systems can operate on a standard signal pattern throughout the day or vary the signal pattern based on the time of day or week to accommodate predicted traffic levels. However, other factors, such as weather, can influence traffic levels and safety.

SUMMARY

In one exemplary embodiment, a method of operating an intersection traffic signal includes operating the intersection traffic signal based on a standard signal pattern, determining an adverse road condition on a road surface adjacent an intersection, and determining when a first vehicle on the road surface is within a predetermined distance of the intersection. A signal time period is adjusted for the intersection traffic signal when the adverse road condition is present and the first vehicle is within a predetermined distance of the intersection.

In a further embodiment of any of the above, the signal time period is adjusted for the intersection signal and includes extending a cautionary signal time period.

In a further embodiment of any of the above, the cautionary signal time period that occurs after a predetermined lapsed time for a go signal of the intersection traffic signal for the first vehicle is adjusted.

In a further embodiment of any of the above, the signal time period for the intersection traffic signal that maintains a constant overall signal period of the intersection traffic signal for the first vehicle is adjusted.

In a further embodiment of any of the above, it is determined if the adverse road condition is present by monitoring at least one of a road surface condition adjacent the intersection with at least one sensor or receiving a wheel slippage signal from the first vehicle.

In a further embodiment of any of the above, a speed of the first vehicle approaching the intersection is determined.

In a further embodiment of any of the above, the signal time period for the intersection traffic signal is adjusted when a speed of the first vehicle is above a predetermined speed threshold and within the predetermined distance of the intersection.

In a further embodiment of any of the above, it is determined if a second vehicle is present in cross traffic at the intersection traffic signal.

In a further embodiment of any of the above, it is determined if the second vehicle is located within a predetermined distance of the intersection.

In a further embodiment of any of the above, the second vehicle is signaled when the adverse road condition is present and the first vehicle is within a predetermined distance of the intersection.

In a further embodiment of any of the above, the signal time period for the intersection traffic signal adjustment includes extending a cautionary signal time period and reducing a go signal time period for the first vehicle.

In a further embodiment of any of the above, the standard signal pattern is returned to when the first vehicle has passed through the intersection.

In a further embodiment of any of the above, to determine if the adverse road condition is present, the road surface adjacent the intersection is monitored with at least one sensor.

In a further embodiment of any of the above, at least one sensor includes at least one of a video camera, rain sensor, or temperature sensor.

In a further embodiment of any of the above, at least one of a video camera, radar, lidar, or an inductance sensor is utilized to determine when the first vehicle on the road surface is within the predetermined distance of the intersection.

In a further embodiment of any of the above, a wheel slippage signal from the first vehicle is received to determine if the adverse road condition is present In a further embodiment of any of the above, the wheel slippage signal received from the first vehicle originates from at least one wheel speed sensor in the first vehicle.

In another exemplary embodiment, a traffic signal controller includes a processor which is in communication with memory and is configured to operate an intersection traffic signal with a method including operating the intersection traffic signal based on a standard signal pattern. The method includes determining an adverse road condition on a road surface adjacent an intersection and determining when a first vehicle on the road surface is within a predetermined distance of the intersection. A signal time period for the intersection traffic signal is adjusted when the adverse road condition is present and the first vehicle is within a predetermined distance of the intersection.

In a further embodiment of any of the above, the adjustment to the signal time period for the intersection signal includes extending a cautionary signal time period.

In a further embodiment of any of the above, it is determined if the adverse road condition is present if a wheel slippage signal from the first vehicle is received or by monitoring at least one of a road surface condition adjacent the intersection traffic signal with at least one sensor.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 is a schematic view of an example intersection traffic signal assembly.

FIG. 3 illustrates an example method of operating the intersection traffic signal assembly.

DETAILED DESCRIPTION

Figure 1:
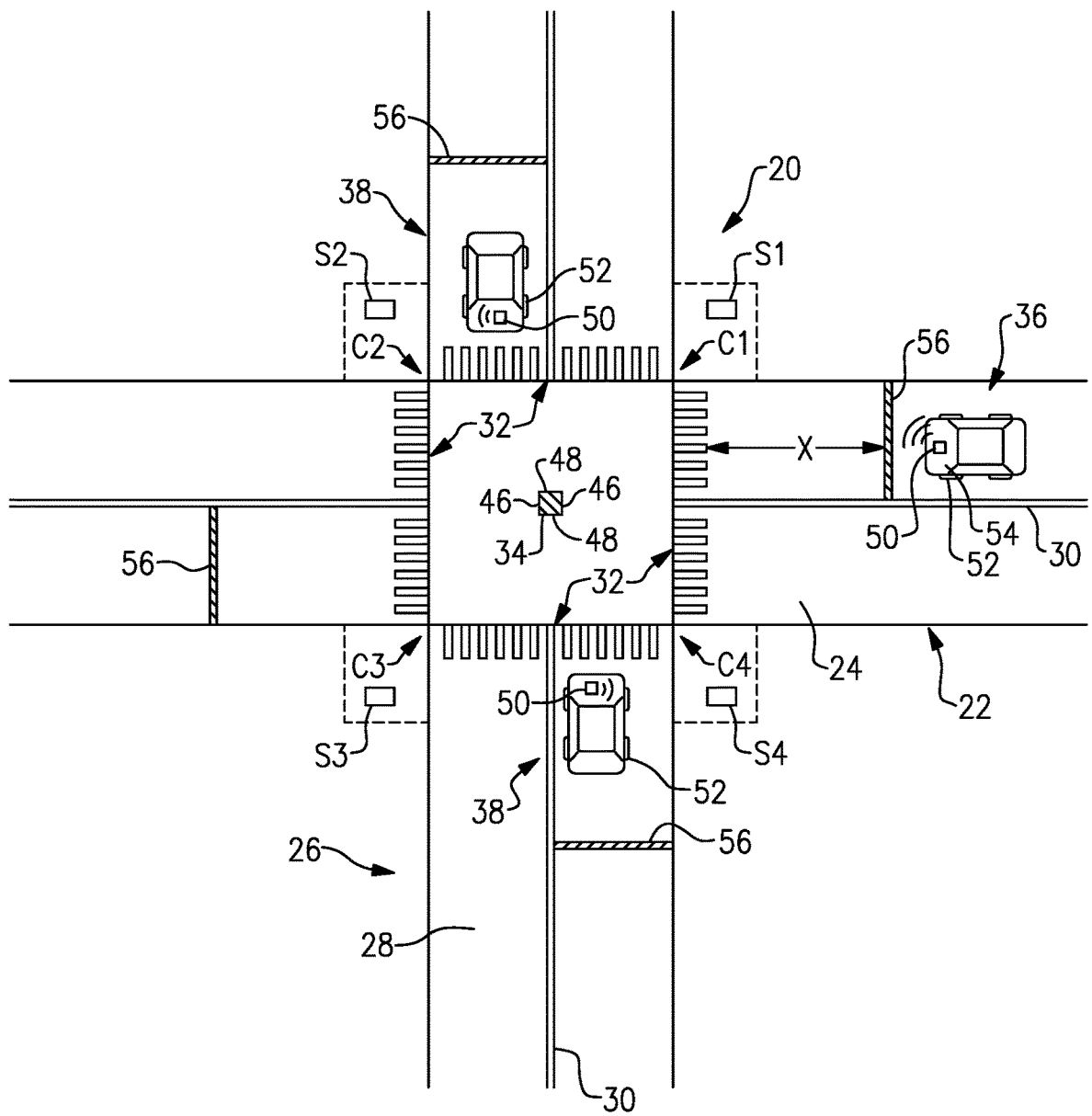
FIG. 1 is a schematic view of an example intersection.

FIG. 1 illustrates an example intersection 20 of a first roadway 22 having a first road surface 24 and a second roadway 26 each having a second road surface 28. In the illustrated example, the first and second roadways 22, 26 are for bi-directional traffic divided by a centerline 30 with at least one first vehicle 36 on the first roadway 22 and at least one second vehicle 38 on the second roadway 26. A plurality of cross-walks 32 define a perimeter of intersection 20.

At least one intersection traffic signal 34 is located in or adjacent the intersection 20. The traffic signal 34 communicates to drivers traveling in opposite directions along the first and second roadways 22, 26 whether or not to continue through the intersection 20 or stop prior to entering the intersection 20. In the illustrated example, the traffic signal 34 includes four sides that correspond to each direction of traffic at the intersection 20. However, this disclosure also applies to traffic signals 34 that have more or less than four directions of traffic to manage.

In the illustrated example, the intersection 20 includes four corners C1, C2, C3, C4 located at a corresponding junction of the first and second roadways 22, 26. Each of the corners C1, C2, C3, C4 include a sensor assembly S1, S2, S3, S4, respectively. However, there could be more or less than four corners C1-C4 and four sensor assemblies S1-S4 based on the number of directions of travel at the intersection 20.

As shown in FIGS. 1 and 2, a controller 40 is in electrical communication with each of the sensor assemblies S1-S4. The controller 40 includes a microprocessor in communication with memory for performing the operations outlined in this disclosure. Each of the sensor assemblies S1-S4 include at least one of a video camera 42A, radar 42B, lidar 42C, a temperature sensor 42D, a rain sensor 42E, and a wireless communicator 42F. However, the temperature sensor 42D and the rain sensor 42E could be located in only one of the sensor assemblies S1-S4. Additionally, the wireless communicator 42F could be directional and only broadcast and receive from a vehicle in an adjacent lane of travel.

The controller 40 is also in electrical communication with a first set of traffic signals 46 for the first roadway 22 and a second set of traffic signals 48 for the second roadway 26. The first set of traffic signals 46 each include a stop signal 46R, a caution signal 46Y, and a go signal 46G and the second set of traffic signals 48 each include a stop signal 48R, a caution signal 48Y, and a go signal 48G.

During normal operation, the first and second set of traffic signals 46, 48 follow a standard signal pattern from the controller 40. The standard signal pattern provides a predetermined cycle time for each of the first and second set of traffic signals 46, 48. Step 102. The standard signal pattern may include variations based on a time of day or a day of the week.

While the first and second set of traffic signals 46, 48 are operating under the standard signal pattern, the controller 40 determines if there is an adverse road condition adjacent the intersection 20. Step 104. The adverse road condition indicates that the first and second road surface 24, 28 may provide reduced traction to the first and second vehicles 36, 38. The reduction in traction for the first and second vehicles 36, 38 could indicate an increased distance needed to stop either the first or second vehicles 36, 38.

The controller 40 can identify the adverse road condition by receiving information from at least one of the video camera 42A, the temperature sensor 42D, and the rain sensor 42E to determine if there is an adverse road condition on either of the first or second roadways 22, 26. For example, the video camera 42A could identify the presence of snow, the temperature sensor 42D could determine if the temperature surrounding the intersection 20 is below or approaching freezing, and the rain sensor 42E could determine the presence and/or amount of rain falling surrounding the intersection 20. If any of these example scenarios occur, the controller 40 could determine the presence of the adverse road condition adjacent the intersection resulting from the weather.

In addition to or as an alternative approach to identifying the adverse road condition discussed above, the controller 40 could communicate through one of the wireless communicators 42F with a vehicle approaching the intersection 20, such as the first vehicle 36 shown in FIG. 1, to determine the presence of the adverse road condition. For example, the first vehicle 36 includes a wireless communicator 50 that can communicate with one or more of the wireless communicators 42F and to notify the controller 40 of wheel slippage at any of the wheels 52 on the first vehicle 36. The first vehicle 36 can utilize a wheel speed sensor 54 located at each of the wheels 52 to determine if there is wheel slippage. If the first vehicle 36 is experiencing wheel slippage approaching the intersection 20, the controller 40 could determine the presence of the adverse road condition.

The controller 40 can determine when a vehicle approaching the intersection, such as the first vehicle 36, is within a predetermined distance X of the intersection 20 by utilizing at least one of the video camera 42A, the radar 42B, or the lidar 42C. Step 106. Alternatively, the controller 40 can be in electrical communication with a roadway sensor 56, such as an inductor sensor that measures changes in inductance as the first vehicle 36 passes over the roadway sensor 56.

The controller 40 can then adjust a signal time period for either the first or second set of traffic signals 46, 48, when the adverse road condition is determined and the first vehicle 36 is within the predetermined distance of the intersection 20. Step 108.

Adjusting the signal time period for at least one of the first and second set of traffic signals 46, 48 includes extending a cautionary signal time period for the caution signal 46Y for the first vehicle 36. The cautionary signal time period for the caution signals 46Y is adjusted after a predetermined length of time of the go signal 46G that is less than a standard length of time for the go signal 46G. Therefore, an overall time period for cycling through the first set of traffic signals 46 does not change between the standard pattern and an adjusted pattern. One feature of maintaining the overall cycle period constant for the first and second set of signals 46, 48 is that the first and second set of signals 46, 48 can remain in a timed configuration with traffic signal signals at adjacent intersections. However, the controller 40 can change the overall pattern if necessary.

Furthermore, the controller 40 can adjust the time period for either of the first or second set of traffic signals 46, 48 based on a speed of a vehicle approaching the intersection 20, such as the first vehicle 36 shown in FIG. 1. The controller 40 can utilize at least one of the video camera 42A, the radar 42B, or the lidar 42C to determine the speed of the vehicle approaching the intersection 20. If the speed of the vehicle is above a predetermined threshold and the adverse road condition is determined or the vehicle is within the predetermined distance of the intersection 20, the controller 40 can adjust the time period for either the first or second set of traffic signals 46, 48.

The controller 40 can also adjust the signal time period for either the first or second set of traffic signals 46, 48 if at least one second vehicle 38 is located in cross traffic at the intersection 20. To determine if one of the second vehicles 38 is located at the intersection 20, the controller 40 can utilize one of the sensor assemblies S2 or S4 to determine a distance of the second vehicle 38 from the intersection 20 and if that distance is within a predetermined distance of the intersection 20. If the second vehicle 38 is not within the predetermined distance, the controller 40 may not adjust the time period for either the first or second set of traffic signals 46, 48, but if the second vehicle 38 is within the predetermined distance, the controller 40 may adjust the time period for either the first or second set of traffic signals 46, 48.

Additionally, the controller 40 can signal the second vehicle 38 when the adverse road condition is present and the first vehicle 36 is within a predetermine distance of the intersection 20. The controller 40 can signal the second vehicle 38 by providing an alert or message to a display, such as a control panel or infotainment screen, in the second vehicle 38.

Moreover, after the controller 40 has adjusted the time period of either the first or second set of traffic signals 46, 48, the controller 40 can return the first and second set of traffic signals 46, 48 to the standard signal pattern if any one of the above determining factors is no longer present.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of operating an intersection traffic signal, the method comprising:
    operating the intersection traffic signal based on a standard signal pattern;
    determining an adverse road condition on a road surface adjacent an intersection, wherein determining if the adverse road condition is present includes monitoring at least one of a road surface condition adjacent the intersection with at least one sensor or receiving a wheel slippage signal from the first vehicle;
    determining when a first vehicle on the road surface is within a predetermined distance of the intersection; and
    adjusting a signal time period for the intersection traffic signal when the adverse road condition is present and the first vehicle is within a predetermined distance of the intersection.

2. The method of claim 1, wherein adjusting the signal time period for the intersection signal includes extending a cautionary signal time period.

3. The method of claim 2, wherein adjusting the cautionary signal time period occurs after a predetermined lapsed time for a go signal of the intersection traffic signal for the first vehicle.

4. The method of claim 3, wherein adjusting the signal time period for the intersection traffic signal maintains a constant overall signal period of the intersection traffic signal for the first vehicle.

5. The method of claim 1, including determining a speed of the first vehicle approaching the intersection.

6. The method of claim 5, wherein adjusting the signal time period for the intersection traffic signal when a speed of the first vehicle is above a predetermined speed threshold and within the predetermined distance of the intersection.

7. The method of claim 1, determining if a second vehicle is present in cross traffic at the intersection traffic signal.

8. The method of claim 7, including determining if the second vehicle is located within a predetermined distance of the intersection.

9. The method of claim 7, including signaling a display on the second vehicle when the adverse road condition is present and the first vehicle is within a predetermined distance of the intersection.

10. The method of claim 7, wherein adjusting the signal time period for the intersection traffic signal includes extending a cautionary signal time period and reducing a go signal time period for the first vehicle.

11. The method of claim 1, including returning to the standard signal pattern when the first vehicle has passed through the intersection.

12. The method of claim 1, wherein determining if the adverse road condition is present includes monitoring the road surface adjacent the intersection with at least one sensor.

13. The method of claim 12, wherein the at least one sensor includes at least one of a video camera, rain sensor, or temperature sensor.

14. The method of claim 12, wherein determining when the first vehicle on the road surface is within the predetermined distance of the intersection includes utilizing at least one of a video camera, radar, lidar, or an inductance sensor.

15. The method of claim 1, wherein determining if the adverse road condition is present includes receiving a wheel slippage signal from the first vehicle.

16. The method of claim 15, wherein the wheel slippage signal received from the first vehicle originates from at least one wheel speed sensor in the first vehicle.

17. A traffic signal controller comprising:
    a processor in communication with memory and configured to operate an intersection traffic signal with a method comprising:
    operating the intersection traffic signal based on a standard signal pattern;
    determining an adverse road condition on a road surface adjacent an intersection, wherein determining if the adverse road condition is present includes monitoring at least one of a road surface condition adjacent the intersection traffic signal with at least one sensor or receiving a wheel slippage signal from the first vehicle;
    determining when a first vehicle on the road surface is within a predetermined distance of the intersection; and
    adjusting a signal time period for the intersection traffic signal when the adverse road condition is present and the first vehicle is within a predetermined distance of the intersection, wherein adjusting the signal time period for the intersection signal includes extending a cautionary signal time period.

* * * * *